D. W. McKENNA.
MEAT SAW CLEANER.
APPLICATION FILED MAR. 4, 1922.

1,438,540.  Patented Dec. 12, 1922.

Inventor
Daniel W. McKenna,
By James G. Wells,
Attorney

Patented Dec. 12, 1922.

1,438,540

UNITED STATES PATENT OFFICE.

DANIEL W. McKENNA, OF LOS ANGELES, CALIFORNIA.

MEAT-SAW CLEANER.

Application filed March 4, 1922. Serial No. 541,221.

*To all whom it may concern:*

Be it known that I, DANIEL W. McKENNA, a citizen of the United States, residing at Los Angeles, California, have invented a certain new and useful Meat-Saw Cleaner, of which the following is a specification.

My object is to make a meat saw cleaner, and my invention consists of the novel features herein shown, described and claimed.

Figure 1:
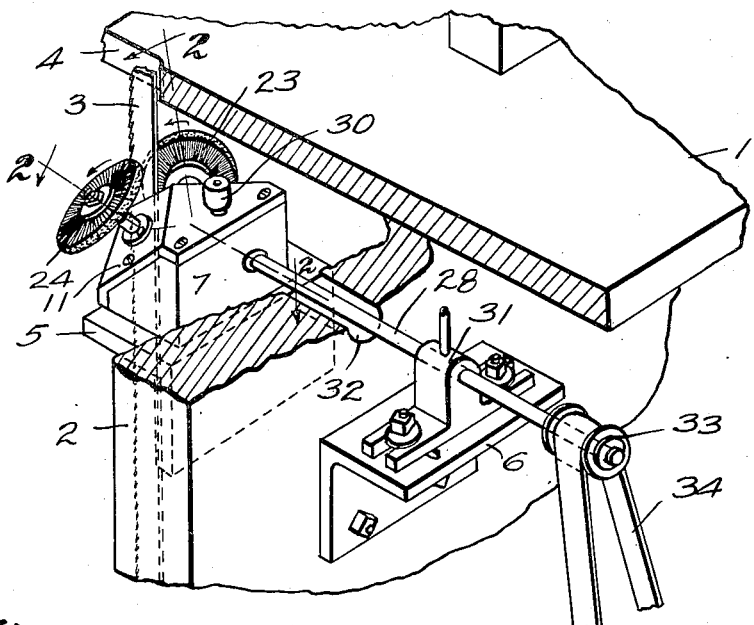
Fig. 1 is a fragmentary perspective of a band saw meat cutter supplied with a meat saw cleaner in accordance with the principles of my invention, the meat saw cleaner being in perspective and in full lines.
Figure 2:
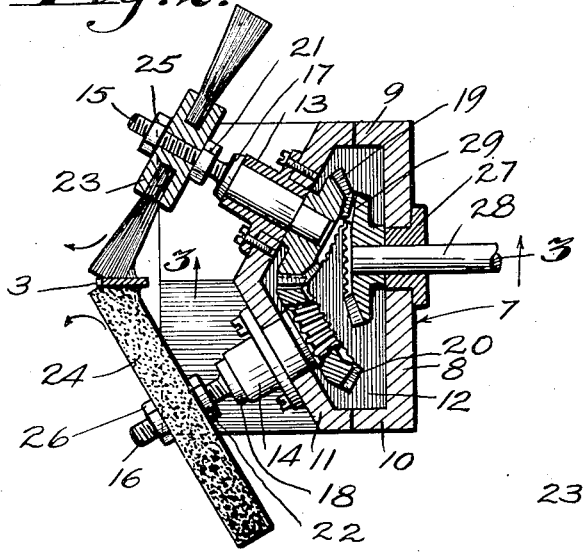
Fig. 2 is a horizontal sectional detail of the meat saw cleaner and taken on the line 2—2 of Fig. 1.
Figure 3:
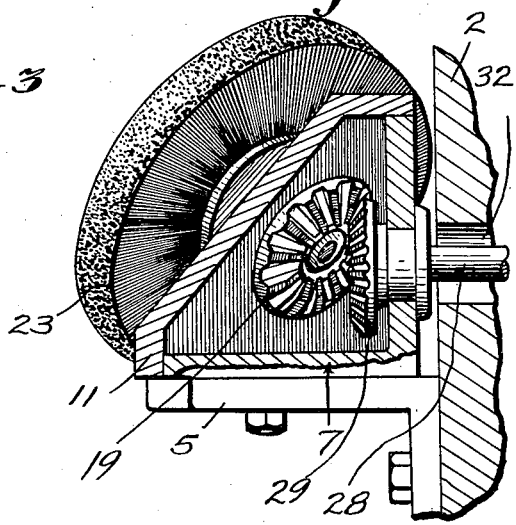
Fig. 3 is a vertical sectional detail on the line 3—3 of Fig. 2.

The meat saw is of the band saw type and has a rigid table 1, a frame 2 supporting the rigid table 1, and a band saw 3 with the portion shown moving downwardly through a slot 4 in the rigid table.

A shelf 5 is mounted upon the front side of the frame 2 and a similar shelf 6 is mounted upon the back side of the frame, the two shelves being substantially in horizontal alinement.

The gear case base 7 is mounted upon the shelf 5 and the back 8 and the sides 9 and 10 extend upwardly from the base 7. The cap 11 fits the base 7, the back 8 and the sides 9 and 10 and is secured in place to form an inclosed chamber 12. Bearings 13 and 14 are formed in the cap 11, said bearings being at angles of about 30 degrees relative to vertical and horizontal planes. Shafts 15 and 16 are mounted in the bearings 13 and 14 and have shoulders 17 and 18 at their outer ends of the bearings, and intermeshing bevel gears 19 and 20 upon their inner ends. The shafts 15 and 16 are screw threaded from the shoulders 17 and 18 outwardly. Nuts 21 and 22 are screwed upon the shafts, brushes 23 and 24 fit against the nuts, and nuts 25 and 26 fit against the brushes, so as to move the brushes out or in by manipulating the nuts.

A bearing 27 is mounted in the back 8 and the meat saw cleaner shaft 28 extends through this bearing and has a bevel gear 29 upon its inner end meshing with the bevel gear 19. An oil cup 30 is mounted on the cap 11 and communicates with the chamber 12. A bearing 31 is mounted upon the shelf 6 and the shaft 28 extends through a clearance opening 32 in the frame 2 and through the bearing 31, and a driving pulley 33 is fixed upon the rear end of the shaft 28 and driven by a belt 34 connecting to the band saw power, not shown.

The brushes 23 and 24 rotate downwardly and outwardly towards each other, as indicated by the arrows. The saw is moving downwardly and the surfaces of the brushes move downwardly and across the sides of the saw in the direction of the saw teeth so as to remove the particles of bone and meat from between the teeth and from the sides of the saw, the surfaces of the brushes moving faster than the saw.

I claim:

A meat saw cleaner comprising a base, a cap mounted on the base and having bearings extending outwardly and upwardly, shafts in the bearings, bevel gears upon the inner ends of the shafts and in mesh, a driving shaft, a bevel gear connecting the driving shaft to one of the other bevel gears, and brushes upon the outer ends of the shafts and adapted to engage opposite sides of a band saw.

In testimony whereof I have signed my name to this specification.

DANIEL W. McKENNA.